United States Patent [19]

Nightingale

[11] Patent Number: 5,390,877
[45] Date of Patent: Feb. 21, 1995

[54] VECTORABLE NOZZLE FOR AIRCRAFT

[75] Inventor: Douglas J. Nightingale, Jonesboro, Ga.

[73] Assignee: Rolls Royce plc, Bristol, England

[21] Appl. No.: 84,706

[22] Filed: Jun. 25, 1993

[51] Int. Cl.6 .............................................. B64C 29/00
[52] U.S. Cl. .................... 244/23 D; 244/12.5
[58] Field of Search ............... 244/12.3, 12.5, 23 A, 244/23 B, 23 D; 239/265.13, 265.19

[56] References Cited

U.S. PATENT DOCUMENTS

| 3,491,970 | 1/1970 | Maguire | 239/265.19 |
| 3,580,530 | 5/1971 | Wada | 244/12.3 |
| 3,704,828 | 12/1972 | Studer et al. | 239/265.19 |

FOREIGN PATENT DOCUMENTS 2229408 9/1990 United Kingdom ............... 244/12.3

WO91/17083 11/1991 WIPO .

OTHER PUBLICATIONS

British Patent Abridgements, UK Patent 922,645, Rolls-Royce Ltd., Nov. 7, 1961.

Primary Examiner—Michael S. Huppert
Assistant Examiner—Anne E. Bidwell
Attorney, Agent, or Firm—Oliff & Berridge

[57] ABSTRACT

In a VTOL or STOL aircraft in which a lift device is housed internally within the aircraft fuselage or wing an outlet nozzle is stowable within the lift device exit aperture. A pair of doors, which when closed conceal the aperture from the sides of the nozzle, and a third folding member form the forward side of the nozzle and support a frame carrying variable vanes which vector the lift thrust.

14 Claims, 5 Drawing Sheets

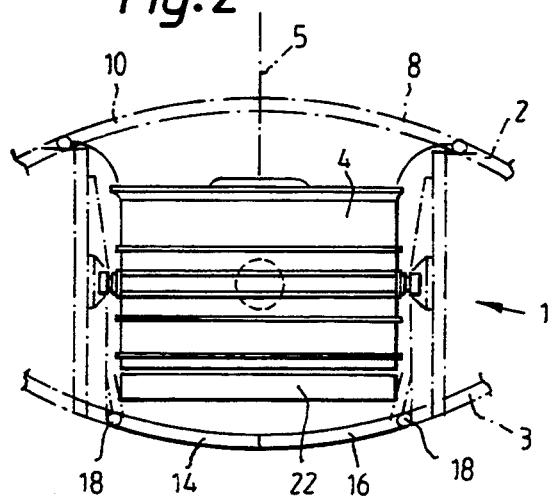
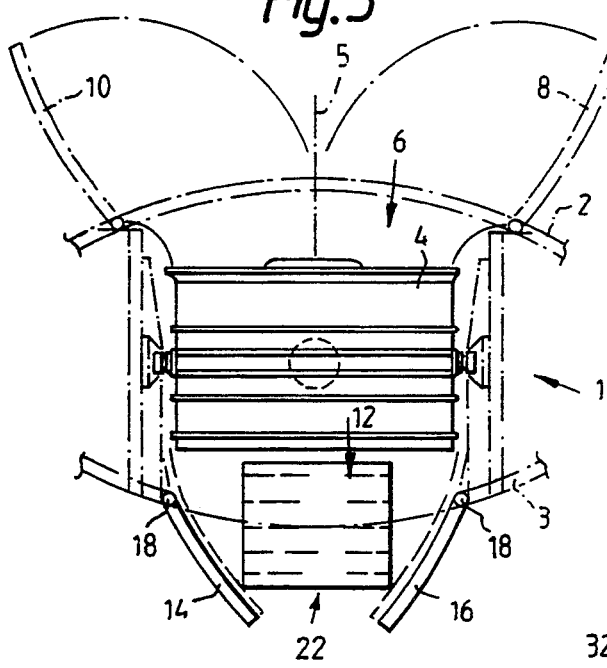
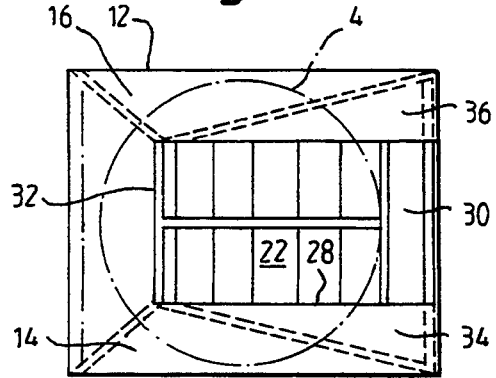

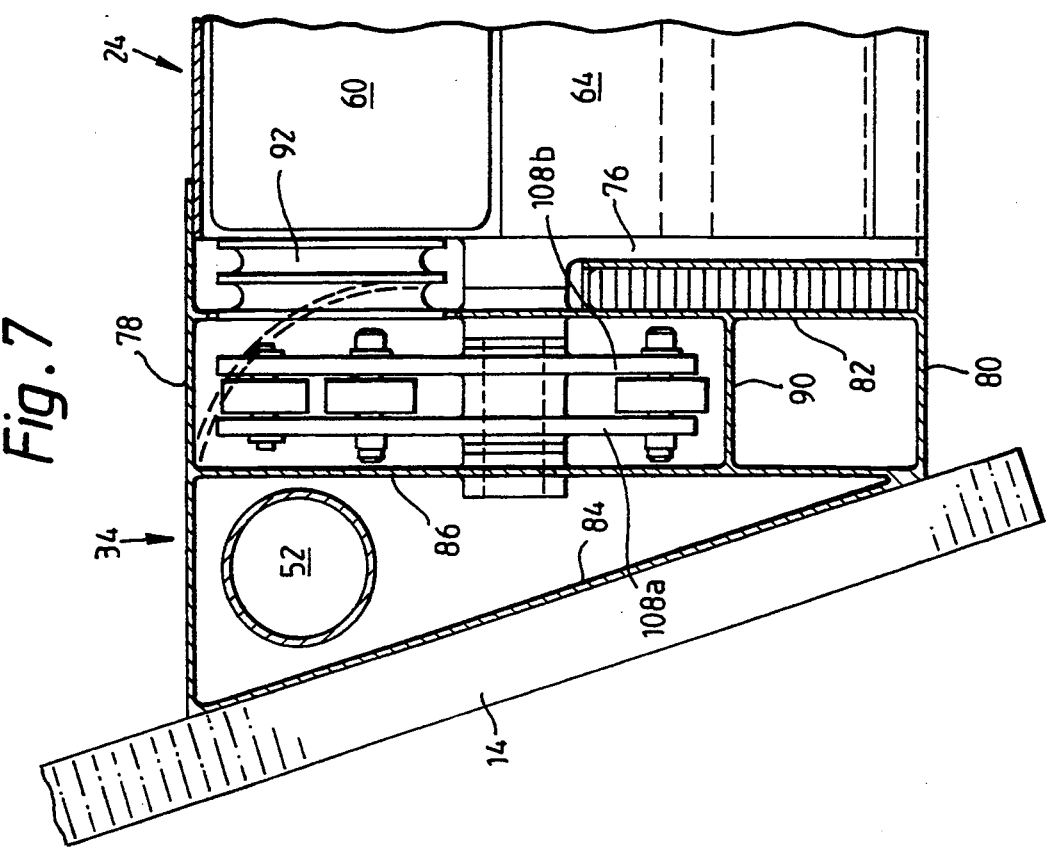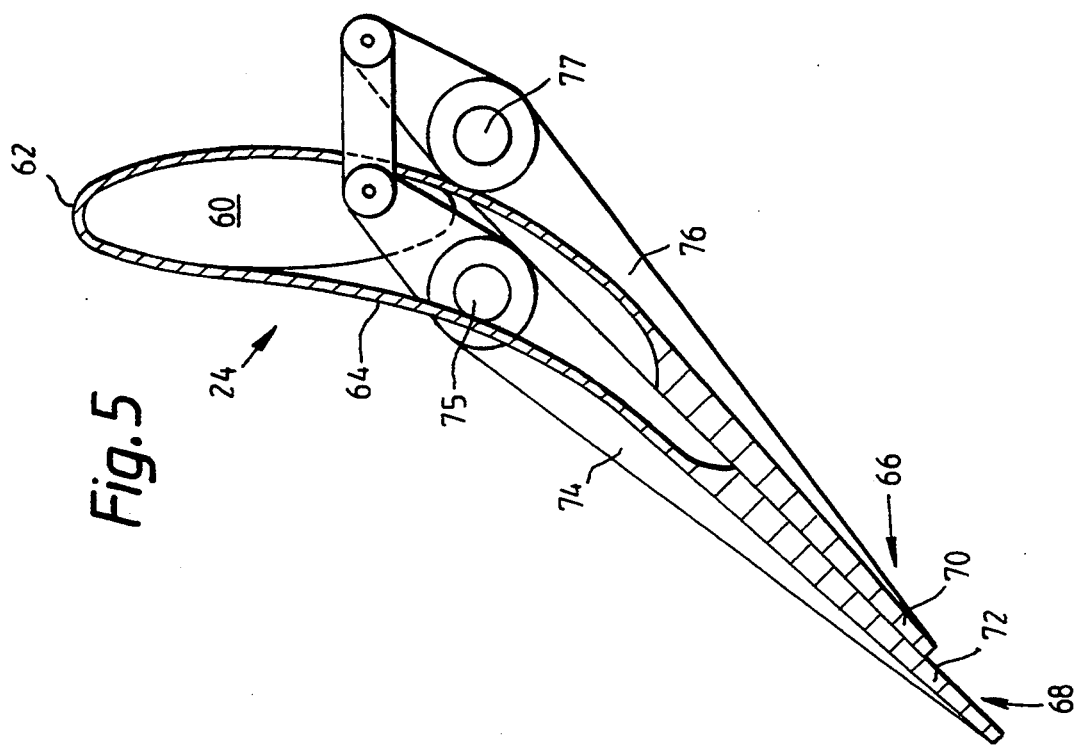

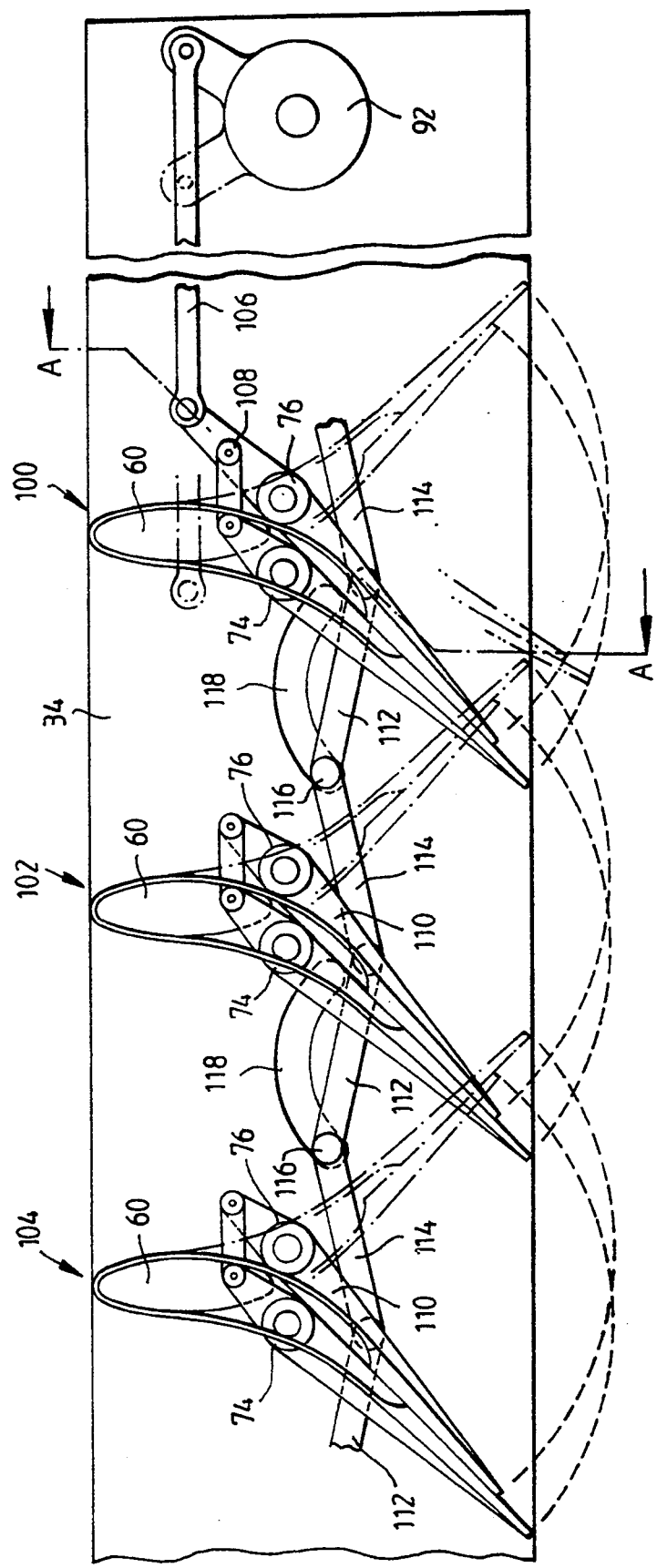

VECTORABLE NOZZLE FOR AIRCRAFT

FIELD OF INVENTION

This invention relates to a vectorable nozzle for an aircraft. In particular the invention concerns an aircraft having vertical take-off and landing (VTOL) or short take-off and landing (STOL) performance, or a combination of these characteristics.

BACKGROUND OF THE INVENTION

There are numerous methods of providing vertical lift for an aircraft. Of particular interest here are the supply of gaseous fluid ducted from a gas turbine propulsion engine exhaust gas stream or by-pass air stream or from both to one or more vectorable nozzles positioned at appropriate places in the aircraft. The exhaust from these nozzles can be vectored to provide vertical lift and forward thrust. In another method one or more dedicated lift engines are installed in the aircraft with their axes substantially vertical to the aircraft longitudinal axis in order to provide lift thrust only. A separate propulsion means is used for forward thrust in conventional wing-borne flight.

There has also been proposed a further method which combines these principles using one or more dedicated lift fans driven from the main propulsion engine by means of an exhaust gas offtake or a mechanical shaft drive. The Ryan Aeronautical Company built and flew a fan-in-wing aircraft in the early 1960's in which power supply to the fans was by gas drive derived from the main propulsion engines. A diverter valve in the exhaust ducts of the two propulsion engines could be switched as required to divert the entire efflux from both engines to supply lift power. The wing fans exhausted through exit louvres which could be angled to convert some of the lift thrust to forward thrust. In addition the louvres could be turned flat to lie flush with the wing undersurface when the lift fan was not in use. The configuration included a smaller nose fan, also gas powered, which exhausted through a louvred aperture in the underside of the aircraft nose which, when not in use, was closed by a pair of longitudinally hung bay doors.

International Patent Application No WO 91/17083 published Nov. 14, 1991 in the name of Lockheed Corporation also described a lift fan arrangement. In this proposal a lift fan is driven by a shaft which may be selectively clutched directly to the low pressure spool of a main propulsion gas turbine engine to supply lift fan power. The lift fan exhausts through a louvred aperture in the underside of the fuselage. However, these doors have two positions only and are either open or closed. Since the main engine exhaust is diverted in a shaft driven arrangement thrust vectoring for transition to forward flight is provided by a telescoping elbow type nozzle at the end of the main engine jet pipe.

These and other arrangements which provide vertical lift selectively during the take-off and landing flight phases must do so without excessively heavy ancilliary equipment, and keep the powerplant and installation as light and compact as possible. The composite powerplant which supplies power for both lift and wing-borne flight appears a good solution providing acceptable transition performance between vertical and forward flight is achieved.

SUMMARY OF THE INVENTION

The present invention therefore has for an objective the provision of a lift fan nozzle capable of achieving the necessary thrust vectoring for vertical lift to wing-borne transition but which avoids parasitic drag during forward flight when not in use.

The invention provides a vectorable nozzle for an aircraft which in use extends outside the surface of the aircraft but which, when not in use, may be retracted to lie entirely within the surface of the aircraft so that it does not present a discontinuity of that surface. It will be understood that such a vectorable nozzle will not cause any increase in parasitic drag or affect any so-called area rule requirements and so does not impair the potential top speed of the aircraft.

Another object of the invention is to provide a vectorable nozzle which has hinged doors or panels located in the underside skin of an aircraft at an appropriate place, and these panels may be opened outwardly of the aircraft to form the walls of a nozzle through which gaseous fluid derived from the aircrafts propulsion engine or from a separate engine or flow generator means passes through. There may be a number of such nozzles in an aircraft.

A further object of the invention is to provide a vectoring nozzle which may be retracted to a stowed position within the aircraft when not in use and deployed selectively as required. Preferably the nozzle includes guide vanes of the rotatable kind so that thrust created by gaseous fluid passing through the nozzle may be vectored through a large range of angles from forward of vertical to nearly horizontal.

The above and other objects and advantages of the invention will become more apparent from the following description.

BRIEF DESCRIPTION OF THE DRAWINGS

FIG. 2 shows the nozzle of FIG. 1 in a stowed position;

FIG. 3 is a front view of the vectorable nozzle shown in FIG. 2;

FIG. 4 is a plan view of the vectorable nozzle shown in FIGS. 2 and 3;

FIG. 5 is a transverse section through a variable camber vane of the type employed in the nozzle of FIG. 1;

FIG. 6 is a section through a side member of the nozzle frame of FIG. 1 showing the location of the variable camber vane operating mechanism;

FIG. 7 is another view on section AA in FIG. 6, showing the variable camber vane operating mechanism in more detail.

DETAILED DESCRIPTION OF PREFERRED EMBODIMENTS OF THE INVENTION

The invention seeks to provide a vectorable nozzle which is retractable into an aircraft fuselage when not in use but which retains the advantages of a conventional, non-retractable nozzle.

Figure 1:
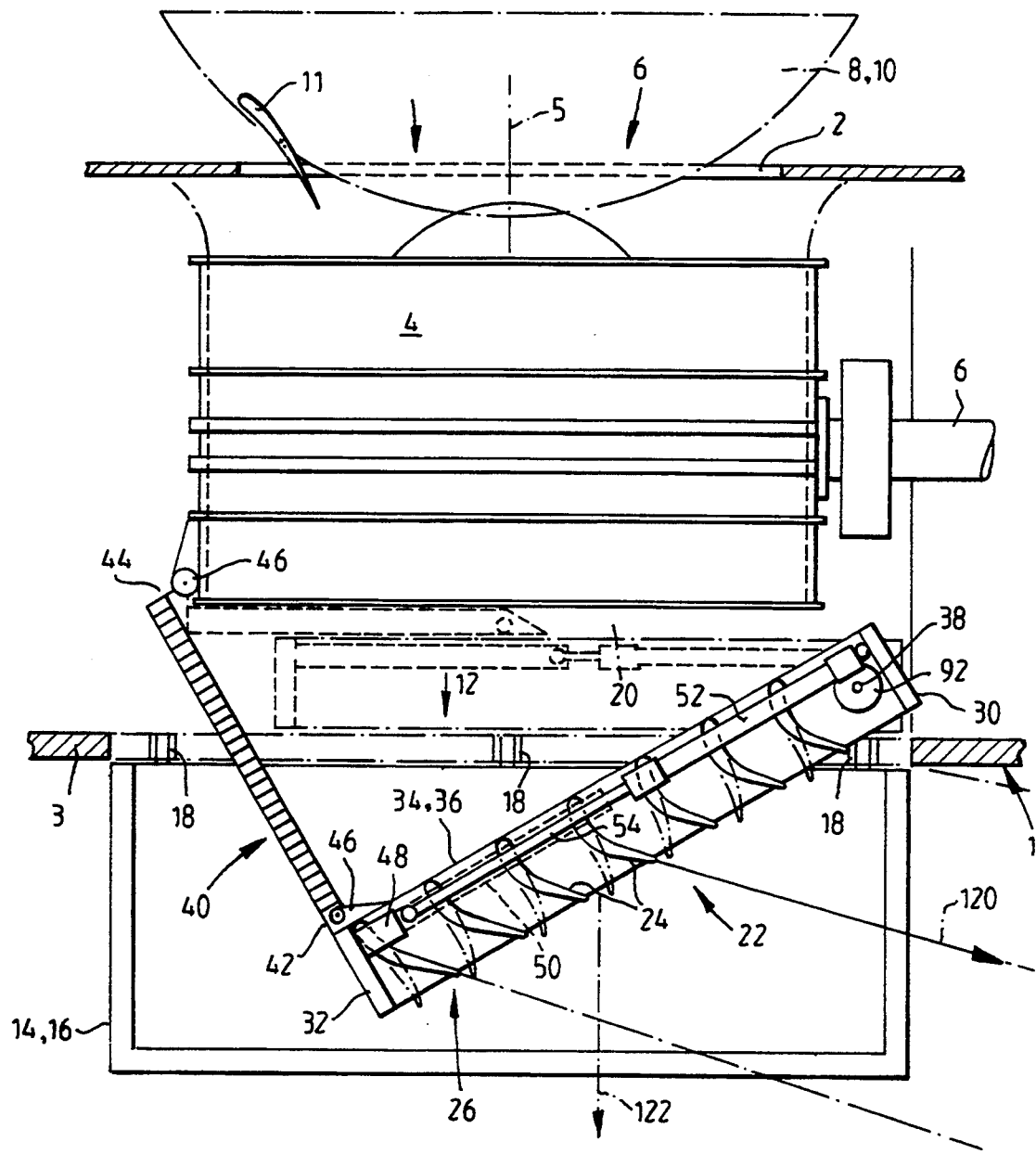
FIG. 1 is a side view in partial section showing a vectorable nozzle according to the invention.

Referring now to the drawings FIG. 1 shows part of a longitudinal cross-section through the fuselage 1 of a VTOL aircraft illustrating a lift fan arrangement. In the drawing the fuselage has an upper surface 2 and a lower surface 3 between which is mounted a lift fan housed within cylinder 4. The lift fan is mounted so that its rotational axis 5 is substantially vertical. A drive shaft 6 transmits motive power from an engine (not shown) to the fan 4 through a clutch (also not shown) which may be disengaged for normal flight i.e. wing borne flight as opposed to powered lift. Bevel gears within the lift fan cylinder 4 transmit drive from shaft 6 to the orthogonally disposed fan and provide any required gear reduction ratio.

The fuselage upper surface 2 is formed with a fan air entry aperture 6 which may be sealed by doors 8,10 which when closed lie flush with the fuselage surface 2. In the illustrated arrangement the fan air entry aperture 6 is circular in plan view and the doors 8,10 are generally semi-circular and hinged at their peripheries. The doors 8,10 are shown in their open position in FIGS. 1 and 3, and in the closed position in FIG. 2. An air turning vane 11 may be provided to assist smooth flow entry of ambient air into the lift fan cylinder particularly during the transition phase to forward flight.

A fan air exit aperture, generally indicated at 12, is formed within the underside of the fuselage surface 3 and this may be closed by a pair of doors 14,16. In the particular embodiment the exit aperture 12 is rectangular in plan view and the doors 14,16 are similarly shaped. The doors are hinged at 18 along their outer longitudinal sides to the fuselage. The doors 14,16 are shown in the open position in FIGS. 1 and 3, and in the closed position in FIG. 2.

The lower face 20 of the lift fan housing 4 is spaced above the lower fuselage surface 3, thereby creating a shallow plenum chamber below the lift fan. Within this chamber is mounted a deflector array comprising cascade vanes 22 which forms the vectoring part of the nozzle now to be described.

The deflector cascade 22 consists of a frame 26 which is trapezoidal in outline bordering a rectangular aperture 28 containing the vanes. The cascade frame 26 comprises a pair of parallel transverse edge members 30,32, which respectively form the rearmost and forwardmost sections of the frame, and longitudinal side edge members 34,36 which join the ends of the transverse members 30,32 to complete the frame. The inside edges of these four members 30,32,34,36 define a rectangular aperture, which may be discerned in FIGS. 3 and 4. The external outline of the frame is trapezoidal and the side members 34,36 also have trapezoidal cross-sections for reasons which will become apparent.

Towards the wider of the two parallel transverse edge members 30 the frame 26 is pivoted to the aircraft airframe at a location towards the rearward edge of the aperture 12. This pivot 38 is located within and to one side of the plenum volume immediately below the lift fan housing 4. The maximum external dimensions of the frame 26 are less than the dimensions of the aperture 12 so that the deflector cascade 22 may pass through the aperture for stowage within the plenum volume below the lift fan.

The forward edge of the frame 26, defined by the shorter of the two parallel transverse members 32, is supported by a strut or door 40 which, like the periphery of frame 26 is trapezoidal in shape. This door 40 has two parallel edges 42,44 the longer of these two edges 44 is pivotally attached at 46 to the fan housing 4 or to the airframe. In either case the door 40 is mounted so that it may be hinged to lie horizontally within plenum volume between the lower face of fan housing 4 and the stowed deflector cascade 22, as represented in FIG. 1 by the dashed outlines.

The door 40 is connected with the cascade frame 26 in such as way as to accomplish the necessary movement to stow and deploy the deflector cascade. At either end of the shorter side 42 the door 40 is pivotally attached to a mounting bracket 46 which is carried by a slider block 48. Each of these slider blocks is engaged with a track 50 which runs longitudinally within each frame side member 34,36 along part of its length. Linear-stroke actuators 52 are mounted inside each of the side members, in line with the track 50 and with their output members 54 coupled to the respective slide blocks 48. Preferably the actuators 52 are flexibly mounted on frame end member 30 and flexibly coupled to slide blocks 48 so as to be tolerant of slight misalignment and flexing during use.

In operation, the actuators 52 are extended to deploy the deflector cascade 22 to the operational position depicted by solid lines in FIG. 1, and are contracted to retract the cascade and stow it at the position depicted by dashed lines within the plenum volume beneath fan housing. When the actuators 52 are extended the blocks 48 are pushed along tracks 50 towards the shorter transverse frame member 32. Thereby the cascade frame 26 and the supporting door 40 are rotated about their respective pivots 38,46 and deployed into the position depicted by solid lines in FIG. 1. The deflector cascade 22 thus lies obliquely with respect to the plane of the discharge aperture of the lift fan.

In sequence with deployment of the cascade 22 the bay doors 14,16 are opened to hang below the fuselage underside 3 to either side of the aperture 12. When the doors are opened the cascade is deployed to lie between the doors supported at its forward edge 32 by the door 40. The sides 34,36 of frame 26 and of the door 40 are arranged to abut the inner faces of the bay doors 14,16. Preferably the edges of door 40 and the side faces of the frame member 34,36 are inclined to provide area contact with the inner surfaces of the doors 14,16 as will be seen in FIG. 3. Sealing means may be provided between these confronting faces. These components thus co-operate to form a nozzle to receive the whole mass flow of the lift fan housed at 4 in which the resulting thrust is vectored in a direction determined by the setting of the vanes 24 contained in deflector cascade 22.

The nozzle is shown in its operating or deployed position in end view in FIG. 3 and plan view in FIG. 4, and in its stowed position in end view in FIG. 2.

For the purposes of vectoring the direction of thrust delivered by the nozzle of FIGS. 1–4 the vanes 24 are variable in camber. One arrangement for achieving this will now be described with reference to FIGS. 5, 6 and 7.

FIG. 5 shows a cross-section through a variable camber vane 24 which comprises an elongate rib 60 of elliptical cross-section which extends between frame side members 34,36 parallel to transverse end members 30,32. Preferably, as illustrated, the length of the major axis of the ellipse is substantially greater than the length of the minor axis in order to provide an advantageous leading edge vane profile at 62. The flanks or pressure surfaces of a vane comprises a thin metal sheet 64, for example the metal may be titanium or another suitable resilient sheet material, which is bent around the elongate rib 60. Each sheet 64 extends between the frame side members 34,36 and is bonded to the rib, for example, by brazing or welding along the vane leading edge.

Downstream ends 65,66 of the vane surfaces are formed with thickened sections 67,68 respectively. These sections have abutting surfaces which are sprung together by the inherent resilience of the sheet material. They may be formed integrally with the sheet material of the vane skin or formed separately and joined thereto. At opposite side edges the thickened vane sections 67,68 are joined to operating levers 69,70 respectively which form part of a vane operating mechanism described below with reference to FIGS. 6 and 7. The thickened vane sections 65,66 are joined to the levers towards the downstream ends of the vane surfaces and the distal ends of the levers.

The levers 69,70 are formed with upstanding spindles 71,72 by means of which they are pivotally mounted in the side members of the nozzle frame. The mounting will be described in greater detail with reference to FIG. 7. Each pair of levers 67,70 are spaced a short distance apart in the nozzle frame and the spindles project outwardly into the hollow frame members. Each spindle 71,72 is splined along part of its length and engaged by operating levers 73,74 respectively. FIG. 5, in order not to unnecessarily clutter the drawing, shows only a portion of lever 74 which is the counterpart of lever 73. In fact, as will be appreciated from FIGS. 6 and 7 the operating lever 74 is substantially longer than illustrated in FIG. 5. One of these operating levers 74 is driven by the cascade operating mechanism, see FIG. 6, while the other lever 73 acts as a slave and is coupled to the driven lever 74 by a pivoted link 75 between the ends of the levers 73,74 spaced a short distance from the spindles 71,72.

The input operating lever 74 drives the vane lever 70 attached to one side of the vane skin 64 and bends the vane surface through a required deflection angle. The other vane lever 69 is caused to rotate through the same angle by the slaving action of levers 73,74 and coupling link 75. The opposite vane surface is therefore caused to bend to produce the same deflection angle. In FIG. 5 the vane surfaces and the associated levers are shown by solid lines towards one extreme deflection angle, and by chain lines towards an opposite deflection angle. The changes in curvature of the opposite vane surfaces and the sliding movement of the abutting, flat downstream portions 65,66 of the vane surfaces and their relative movement due to the spatial separation of the pivot axes of spindles 71,72 is clearly shown. The levers 73,74 are also curved to provide adequate mutual clearance during rotation.

It will also be apparent as a consequence of the flexing of the vanes due to rotation of the vane levers 69,70 that the surfaces 64 are subject to tensile forces which act on the leading edge longitudinal ribs 60. The ribs 60 are secured in the nozzle frame by means of flexible rubber mountings 79 at opposite ends of the ribs, see FIG. 7. The mountings 79 absorb the tensile resilient forces and allow the ribs 60 to the displaced slightly to the position shown by the chain-linked outline 60a in FIG. 5.

FIG. 7 shows a view through a cascade frame side member on the section AA in FIG. 6. The frame side member is shown at 34, one end of one of the variable vanes is indicated by the general reference 24, and part of the adjacent bay door is drawn at 14.

The side member 34 as can be seen in FIG. 7 is hollow with a trapezoidal outline and comprises an upper surface 78, a narrower parallel lower surface 80, a perpendicular inner wall 82 adjacent the nozzle aperture and an oblique outer wall 84 abutting the inner surface of the door 14. Internal walls 86,88 and 90 are provided inside member 34 to act as stiffening members and as supports.

The vane operating mechanism of FIG. 6 comprises a powered rotary actuator 92 and duplicate mechanisms at opposite ends of the vanes, one set within each of the cascade frame side members 34,36. The actuator 92 is mounted concentric with the hinge axis 38 of the cascade frame. The preferred form of actuator is a powered hinge unit of the type commonly used in aircraft to operate flying control surfaces, e.g. rudder and ailerons, which can be mounted to double-up as the cascade frame mounting hinge as well as the vane actuator prime-mover.

The vanes 24 are mounted, in the manner described above, in a parallel array extending between the side members 34,36 of the nozzle frame with the leading edge members 60 uppermost. In FIG. 6 three of the vanes are shown including a vane 100 at the center of the array, and two further adjacent vanes 102,104. The actuator 92 drives the center vane via actuator output rod 106 and its associated operating lever 74. This center vane operating lever is provided with an extended portion 108 to which the actuator output rod 106 is pivotally coupled. The extension 108 to the operating lever of the center vane is such that the synchronising link 75 is connected approximately midway between the vane lever spindle 72 and the coupling of rod 106. The remaining vanes on either side of the center vane 100 are driven through further operating lever extension and a series of interconnecting link rods 112 and 114. The remaining vanes are operated by operating levers which include the previously mentioned portion 74 and the portion 110.

The rods 112,114 are substantially equal in length and connected by an articulated joint including a roller 116 which runs in a cam track 118 formed in the wall 86 inside hollow side frame members 34,36. The articulated points of link rods 112,114 are guided by rollers 116 to follow the profile of cam tracks 118 and thereby achieve a variable geometry of levers 110 in the movement of actuator output rods 106. The gaps between the end vanes may be reduced by choosing a suitably different profile for the corresponding cam tracks in order to reduce the variation in the throat area and to keep within fan operating tolerances.

In FIG. 6 the areas of movement of flexible vanes 100-104 are shown by dashed lines and the corresponding end positions are shown either by full solid line or by broken dashed line. The same extreme vane end positions are also shown in FIG. 1 together with arrows 120,122 indicating the corresponding directions of fan exhaust air. Arrow 120 indicates the fan flow direction during forward acceleration in transition from vertical lift to wing-borne flight. Arrow 122 indicates the direction of the fan exhaust for vertical lift.

Figure 8:
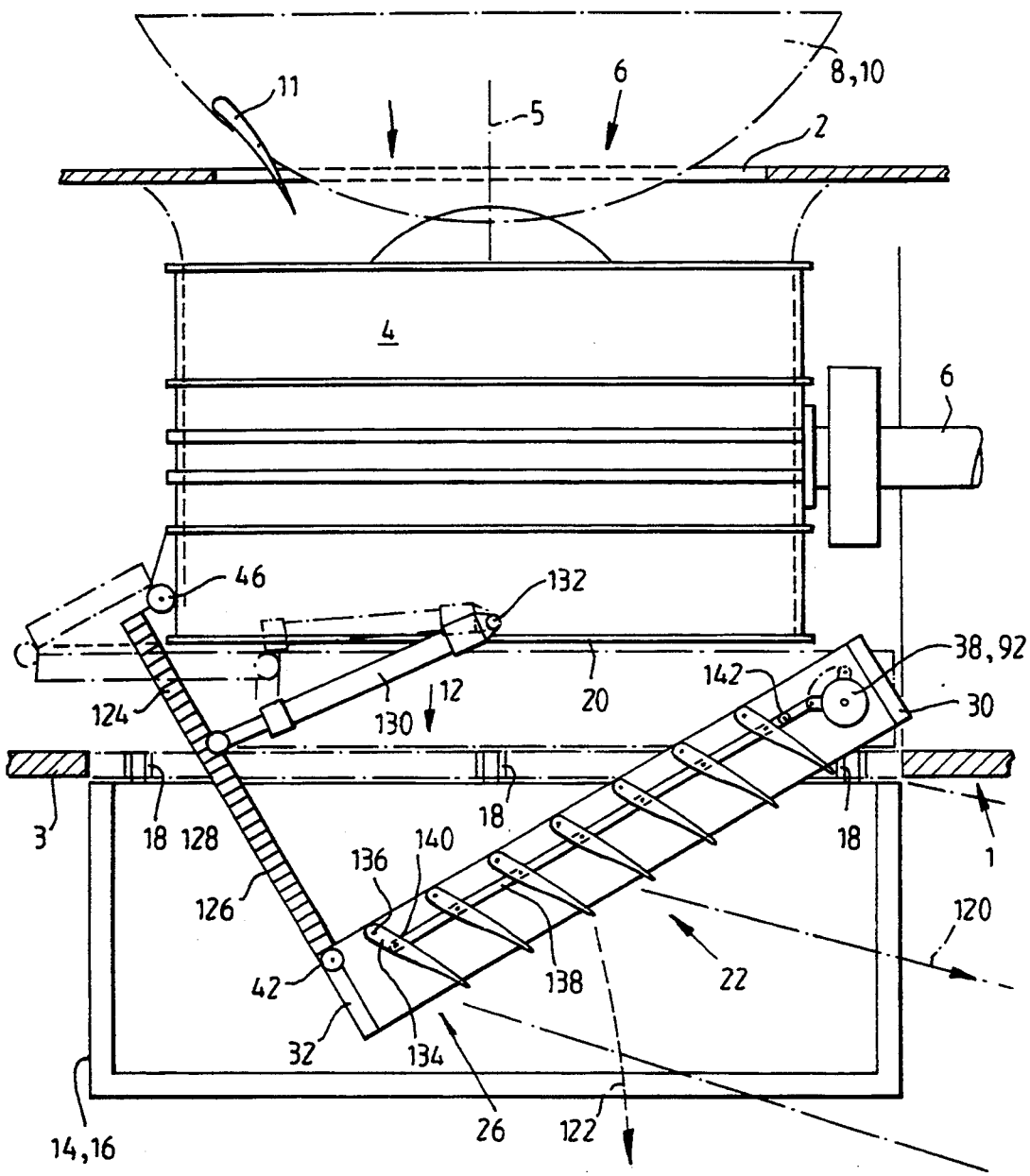
FIG. 8 is a side view, corresponding to the side view of FIG. 1, of a second nozzle arrangement having an alternative forward edge door, and an alternative vane arrangement.

FIG. 8 illustrates a second embodiment of the invention. Many of the components and features are the same as shown in FIG. 1 etc and therefore like parts have been given like references. The essential differences of this second embodiment concern an alternative "third door" arrangement in place of door 40, and an arrangement of rotatable, but fixed camber vanes instead of the former variable camber vanes.

Instead of the plane door 40 which forms the forward wall of the nozzle, the embodiment of FIG. 8 comprises a folding arrangement consisting of two plane doors 124,126 hinged together at 128. The outline shape of the two doors together is identical to the trapezoidal outline of door 40 of the first embodiment. The upper, and longest, edge of door 124 is pivoted at 46 to the fan housing 4 as before, and the lower, and shortest, edge of the lower door 122 is pivoted at 42 to the narrower transverse member 32 of the deflector frame. The two remaining parallel edges of the trapezoidal doors 122,124 are pivoted together at 128. The doors are controlled by a pair of linear-stroke actuators 130 at opposite sides of the door.

Actuators 130 are pivotally mounted at 132 to the fan housing 4 at opposite ends of a diameter and coupled to opposite ends of the inter-door hinge 128. The actuators 130 control the deployment or folded stowage of the doors 124,126 and hence the deployment or stowage of the cascade frame 26. The doors and frame are deployed, as shown by solid lines in FIG. 8, when actuator 130 is retracted. The stowed position of frame and doors are shown by dashed lines in FIG. 8 when the actuator is extended.

Comparison of this arrangement with the earlier described arrangement of FIG. 1 will show that the second embodiment occupies a slightly shallower depth under the fan housing in the stowed position, although a longer stowage chamber is required.

A different arrangement of vanes is also illustrated in FIG. 8, in which the vanes are fixed in camber but pivotally mounted within the cascade frame for limited rotation to deflect the fan flow. Each of the vanes 134 is pivotally mounted in the frame at 136 towards its leading edge.

The vanes are interconnected at their ends by a pair of control rods 138 mounted within the hollow frame side members 34,36. The rods 138 are pivotally connected to the vanes at points 140 at a point on each vane mid-way along its chord. One end of control rod 138 is connected to actuator 92 by an articulated link 142. Thus, the angle of attack of vanes 134 may be varied to control the direction of the fan exhaust thrust vector between the two extreme directions 120,122 as before.

It will be appreciated that the vane arrangements of these two embodiments, and the supporting door arrangements, may be interchanged as required and the combinations described above are not exclusive.

We claim:

1. A vectorable nozzle for a vertical lift aircraft provided with vertical lift means housed within the aircraft extending out of the aircraft through an exit aperture formed in an underside of the aircraft, the nozzle comprising:
   first and second members pivotally hung on first and second opposite sides of the aperture and movable to a closed position to conceal the aperature,
   a third member pivotally hung between the first and second members,
   the first, second and third members being deployed when the vertical lift means is in operation to co-operate to form a nozzle facing a downward side and a rearward side of the aircraft to direct a lift gas stream from the lift means, and
   a plurality of guide vanes supported within a frame suspended between the first and second members, said guide vanes acting to vector the lift gas stream, the guide vane frame being pivotally mounted to the aircraft adjacent a rearward edge of the exit aperture and supported by the third member pivotally attached to a forward edge of the frame.

2. A vectorable nozzle as claimed in claim 1 further comprising guide vane means which, in the operative position, is bounded by the first, second and third members and acts to vector the lift gas stream.

3. A vectorable nozzle as claimed in claim 2 wherein the guide vane means comprises a plurality of parallel variable guide vanes capable of variation to vector exhaust from the lift means.

4. A vectorable nozzle as claimed in claim 3 wherein each of the variable guide vanes is mounted for rotation about a longitudinal axis, and means is provided to rotate all of the vanes in unison to vector the exhaust from the lift means.

5. A vectorable nozzle as claimed in claim 3 wherein each of the variable guide vanes is of a variable camber type, and means is provided for varying the camber of all the vanes in unison to vector the exhaust from the lift means.

6. A vectorable nozzle as claimed in claim 5 wherein each variable guide vane comprises a fixed leading edge portion and movable trailing edge portions.

7. A vectorable nozzle as claimed in claim 6 wherein the fixed leading edge portions of the variable guide vanes are resiliently mounted for limited movement relative to a fixed support.

8. A vectorable nozzle as claimed in claim 6 wherein each of the movable trailing edge portions is formed by split trailing edge members comprising opposite surfaces of each of the vane, each of which is mounted for rotation about a different center of rotation.

9. A vectorable nozzle as claimed in claim 8 wherein opposite sides of the split trailing edge member of a vane are attached to end levers, and the levers of all the vanes are interconnected by a system of articulated links for movement in unison.

10. A vectorable nozzle as claimed in claim 9 wherein the system of articulated links is housed within a cascade frame side member.

11. A vectorable nozzle as claimed in claim 1 wherein the frame is trapezoidal in shape.

12. A vectorable nozzle as claimed in claim 1 wherein the third member comprises an upper plane portion hung from a pivotal mounting carried on the aircraft fuselage towards a forward edge of the lift means exit aperture, and a lower plane portion pivotally attached to the guide vane frame, and said upper and lower plane portions are hinged together so as to fold for stowing within the exit aperture.

13. A vectorable nozzle as claimed in claim 12 wherein the guide frame and said upper and lower portions of the third member are arranged to fold for stowage within the exhaust aperture.

14. A vectorable nozzle as claimed in claim 13 further comprising actuator means arranged to deploy the guide vane frame and third member and to retract them for stowage.

* * * * *

UNITED STATES PATENT AND TRADEMARK OFFICE
CERTIFICATE OF CORRECTION

PATENT NO. : 5,390,877

DATED : February 21, 1995

INVENTOR(S) : Douglas J. NIGHTINGALE

It is certified that error appears in the above-indentified patent and that said Letters Patent is hereby corrected as shown below:

Title page: Item 73, please change "Rolls Royce plc, Bristol, England" to --Rolls-Royce Inc., Reston, Virginia--.

Signed and Sealed this

Twenty-fifth Day of July, 1995

Attest:

BRUCE LEHMAN

*Attesting Officer*     *Commissioner of Patents and Trademarks*